United States Patent [19]

Killian

[11] Patent Number: 5,284,289
[45] Date of Patent: Feb. 8, 1994

[54] PLUG-WELDED AUTOMOTIVE BRACKET FOR AN AIR CHAMBER

[75] Inventor: Michael L. Killian, Troy, Mich.

[73] Assignee: Eaton Corporation, Cleveland, Ohio

[21] Appl. No.: 739,667

[22] Filed: Aug. 2, 1991

[51] Int. Cl.$^5$ .................... B23K 31/02; F16D 65/00
[52] U.S. Cl. .................... 228/165; 228/189; 188/205 R; 248/352; 403/272
[58] Field of Search .................... 228/165, 167, 189; 248/300, 352, 523, 903, 154, 205.1, 220, 220.1; 52/721; 29/402.13; 188/205 R, 170; D8/381, 385; 403/272, 403; 108/51.1, 52.1, 53.5, 55.3

[56] References Cited

U.S. PATENT DOCUMENTS

| | | | |
|---|---|---|---|
| 1,293,872 | 2/1919 | Murray . | |
| 1,634,675 | 7/1927 | Mattice . | |
| 1,741,189 | 12/1929 | Jencks | 108/51.1 |
| 1,742,384 | 1/1930 | Fitzgerald, Jr. | 108/51.1 X |
| 1,760,955 | 6/1930 | Moss | 228/165 X |
| 1,772,732 | 8/1930 | Romine | 108/51.1 |
| 1,832,772 | 11/1931 | Hallowell et al. | 108/51.1 |
| 2,150,651 | 3/1939 | Ewing | 403/272 |
| 2,588,818 | 3/1952 | Franks | 403/403 |
| 3,022,071 | 2/1962 | Saxe . | |
| 3,025,936 | 3/1962 | Saxe . | |
| 3,204,083 | 8/1965 | Fromm et al. | 403/272 |
| 3,512,811 | 5/1970 | Bardgette | 403/272 |
| 3,674,289 | 7/1972 | Geraci | 52/721 X |
| 3,776,329 | 12/1973 | Hope et al. | 188/1.11 |
| 3,854,268 | 12/1974 | Gutner | 248/220.1 |
| 4,425,299 | 1/1984 | Koiso | 228/165 |
| 4,452,347 | 6/1984 | Dozier | 188/205 R |
| 4,601,151 | 7/1986 | Nunley et al. | 228/165 X |
| 4,673,069 | 6/1987 | Staub, Jr. | 188/205 R |
| 4,787,587 | 11/1988 | Deming | 248/205.1 |
| 5,002,164 | 3/1991 | Bowyer | 188/170 |

OTHER PUBLICATIONS

*Metals Handbook* 9th ed. 1983 vol. 6, p. 504.
*Welding Engineering*, Rossi, B. E., 1954, pp. 551–552, 564–567.
*Welding Technology*, Kennedy, G. A., 1974, pp. 116–117.
*The Welding Encyclopedia*, Jefferson, T. B., 1947 12th ed,. p. 504.

Primary Examiner—Paula A. Bradley
Assistant Examiner—Jeanne M. Elpel
Attorney, Agent, or Firm—Watts, Hoffmann, Fisher & Heinke

[57] ABSTRACT

An improvement in process for reinforcing a structure against fatigue failure and the resulting structure are set forth. The structure comprises joined weldable structural portions having adjoining surfaces which meet at a junction and diverge therefrom to form a gap between each other. A brace with weldable terminal feet spans the gap. Each such foot rests against a structural portion, and the brace is plug-welded to at least one of the structural portions through a hole in a foot, or a hole in a structural portion or holes in each such portion where they interface. The invention is especially efficient for bracing an air chamber bracket that is designed for automotive use. A preferred rigid structure has the feet welded at both ends.

11 Claims, 3 Drawing Sheets

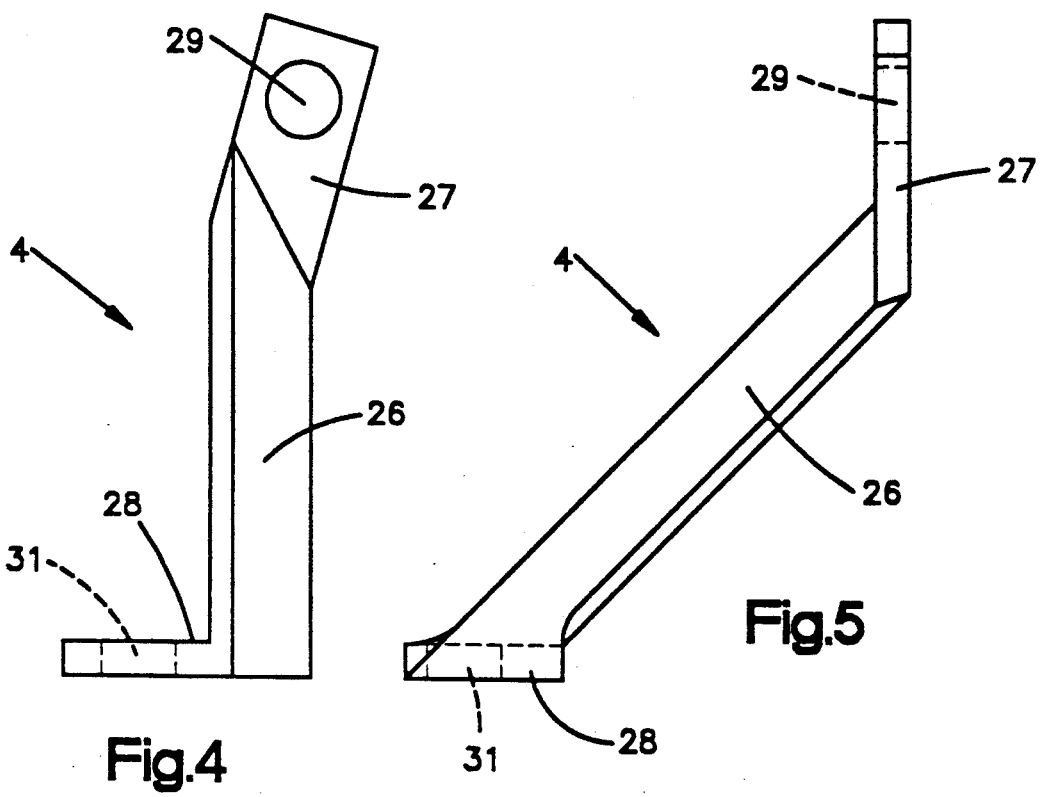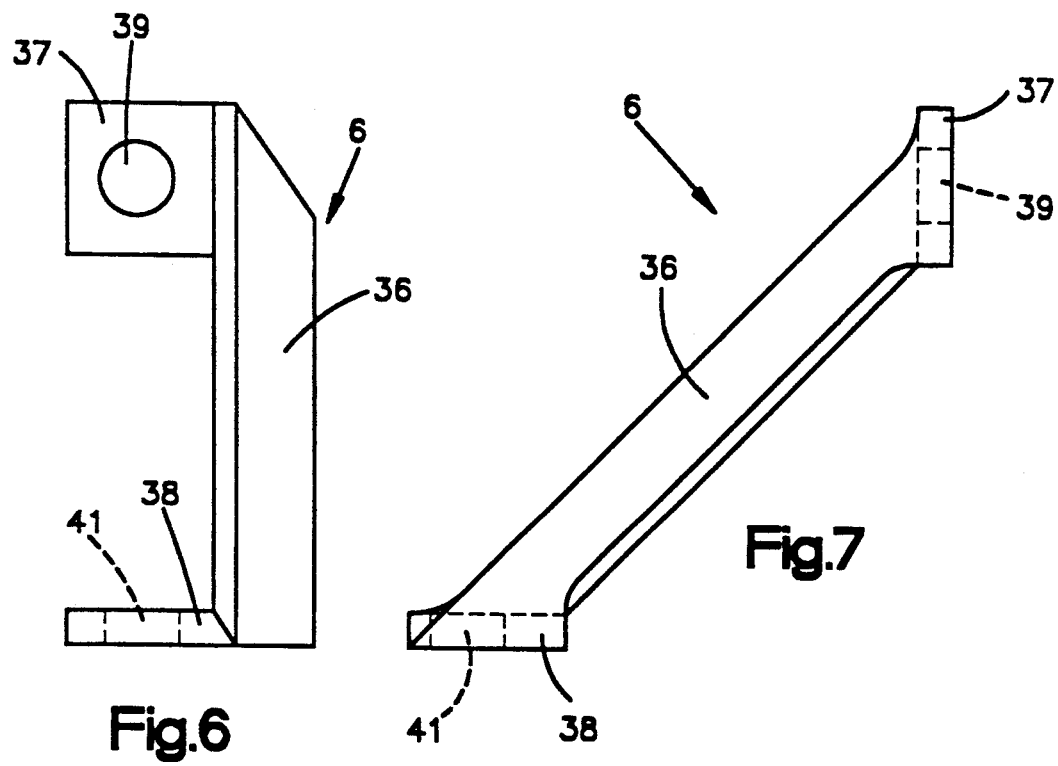

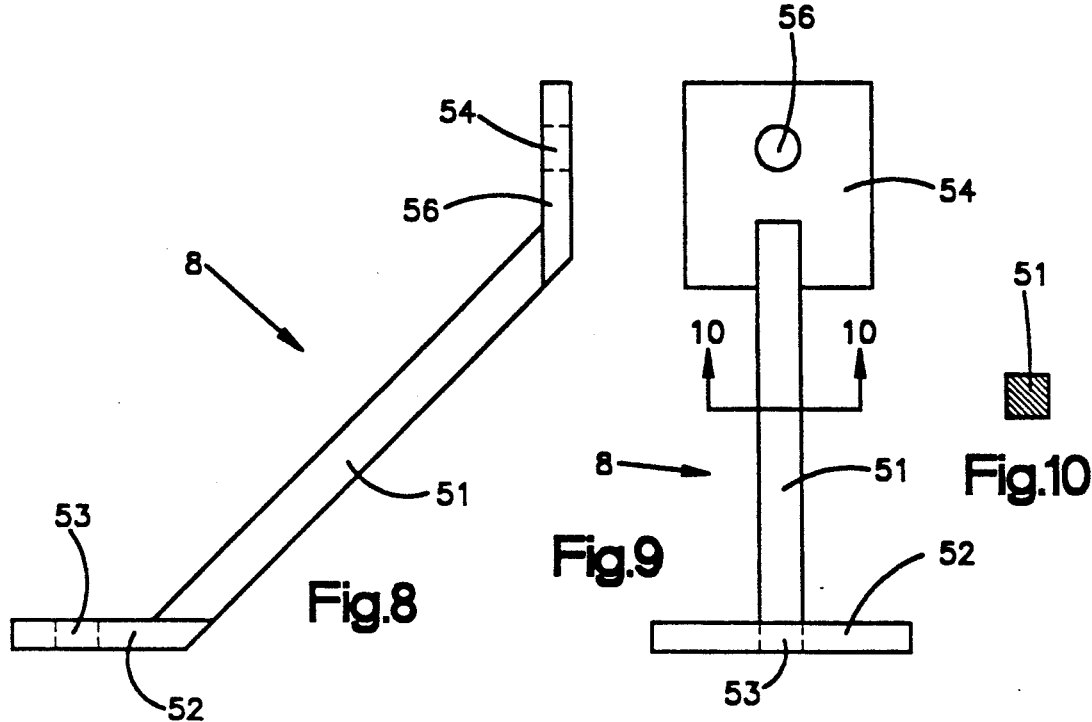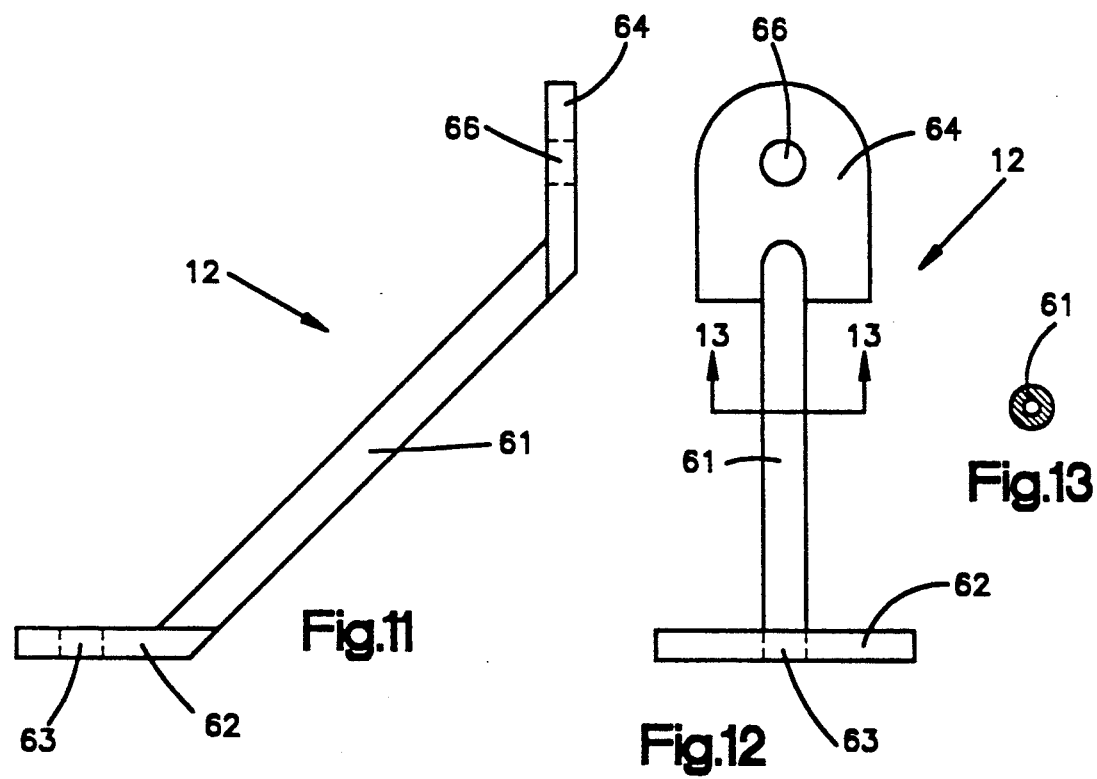

PLUG-WELDED AUTOMOTIVE BRACKET FOR AN AIR CHAMBER

BACKGROUND OF THE INVENTION

1. Field of the Invention

This invention relates to weldable structures such as metal joints, bends and brackets that are braced with gussets, specifically welded-on type gussets that improve the resistance of such structures to fatigue failure from vibration, and to an improved process for effecting the bracing.

2. Description of the Prior Art

The conventional welded-on metal gusset bracing a rigid angular joining between a pair of diverging metal surfaces against fatigue failure from vibration is transverse to (usually normal to) and on edge towards both such metal surfaces. Such "erect" or "plate-type" gusset is a triangle or trapezoid that typically fills in all or most of the angle between such surfaces where they intersect. Such gusset ordinarily is secured by boxing it with fillet weld beads, that is the beads are deposited all along the side edges and the far end edges of the gusset where it meets the metal surfaces being braced. The time required to so weld, for example, a mild steel trapezoidal gusset of this type that is approximately 5/16 inch thick, is about three inches long on its longest side, and reaches down to about one-half inch above the fillet-welded right angle joint between two steel members, is about three minutes using manually a gas metal arc weld (GMAW) method skillfully.

The instant process has as a principal virtue the speeding-up of the welding process considerably, and this without losing fatigue resistance of the resulting gusseted joint in comparison to the same joint having a conventional erect gusset of the same thickness and maximum span. Additionally, the amount of metal in the instant gusset structure for the same service can be less than that in the conventional event gusset while attaining essentially the same or better operating performance. Thus, the instant structure represents appreciable economy and speed of assembly, as well as simplicity and versatility of gusset design, manufacture, and attachment onto the structure.

The invention utilizes plug welds. A plug weld is a deposit of weld metal inside a hole (not necessarily circular in cross-section) that goes clear through one weldable metal piece and abuts another weldable metal piece. The weld connects the two pieces. Such welds often substantially fill the weld hole, but need not do so to be effective; a weld bead around the inner periphery at the base of the weld hole in one piece of metal where it abuts the other can be quite effective for many of the instant structures.

Plug welds in various configurations have been used heretofore to make connections between various metal pieces, to make elements for various construction units, and to make marine piling connections. However, to depart from the conventional erect gusset with its fillet welding attachment to the surfaces being braced, to employ a footed type between joined diverging surfaces, and to plugweld the feet in place to brace such surfaces against fatigue failure is believed novel as well as being surprisingly economic and effective.

SUMMARY OF THE INVENTION

One aspect of the invention is a structure comprising a pair of joined weldable structural portions, said structural portions having adjoining surfaces which meet at a junction and diverge therefrom to form a gap between each other; and a brace having a bridging portion with two ends and a weldable foot portion at each end, said brace spanning the gap with one of its foot portions being in contact with one of said structural portions to form a first interface, and another of its foot portions being in contact with the other of said structural portions to form a second interface, one of the contacting portions at each said interface having a hole clear through it and a plug weld in the hole, and said plug weld attaching a foot portion to one of said structural portions at the interface therebetween.

Another aspect of the invention is an improvement in process for bracing a bifurcated structure with a gusset, the structure comprising two weldable structural portions, said structural portions having adjoining surfaces which meet at a junction and diverge therefrom to form a gap between each other, the improvement comprising:

disposing a brace across the gap, the brace having a bridging portion with two ends and a weldable foot portion at each end, one of the foot portions being in contact with one of said structural portions to form a first interface, and the other of said foot portions being in contact with the other of said structural portions to form a second interface, one of the contacting portions at each interface having a weld hole clear through it;

welding a plug weld in said weld hole at each said interface, and said plug weld attaching a foot portion to one of said structural portions.

The novel structure, apart from any gusset or strap, may be basically a bent piece of weldable metal, usually flat stock. More frequently, however, the structural portions being braced are joined by welding, such as fillet welding. Most of the elements being welded will comprise steel, and most of the intersections or bends so braced will project from each other at substantially a right angle. The ordinary fillet weld is a weld of approximately triangular cross section joining two surfaces at right angles to each other in a lap joint, T-joint, or corner joint. However, in this application, intersection of the two surfaces also may form an acute or obtuse angle instead, and the intersection may define a straight or curved line that may be in a single plane or in more than one plane.

BRIEF DESCRIPTION OF THE DRAWINGS

FIG. 4 is the frontal elevation view of a suitable alternative strap gusset for use in this invention;

FIG. 5 is a side elevation of the strap gusset of FIG. 4;

FIG. 6 is the frontal elevation view of another suitable alternative strap gusset for use in this invention;

FIG. 7 is a side elevation view of the strap gusset of FIG. 6;

FIG. 8 is a side elevation of a splay-footed gusset with a bridging portion of substantially square cross-section for use in this invention;

FIG. 9 is a frontal elevation of the gusset of FIG. 8;

FIG. 10 is a cross-sectional view taken through plane of line 10—10 of FIG. 9;

FIG. 11 is a side elevation of another splay-footed gusset with a bridging portion of round cross-section for use in this invention;

FIG. 12 is a frontal elevation of the gusset of FIG. 11; and

FIG. 13 is a cross-sectional view taken through plane of line 13—13 of FIG. 12.

DESCRIPTION OF PREFERRED EMBODIMENTS

Figure 1:
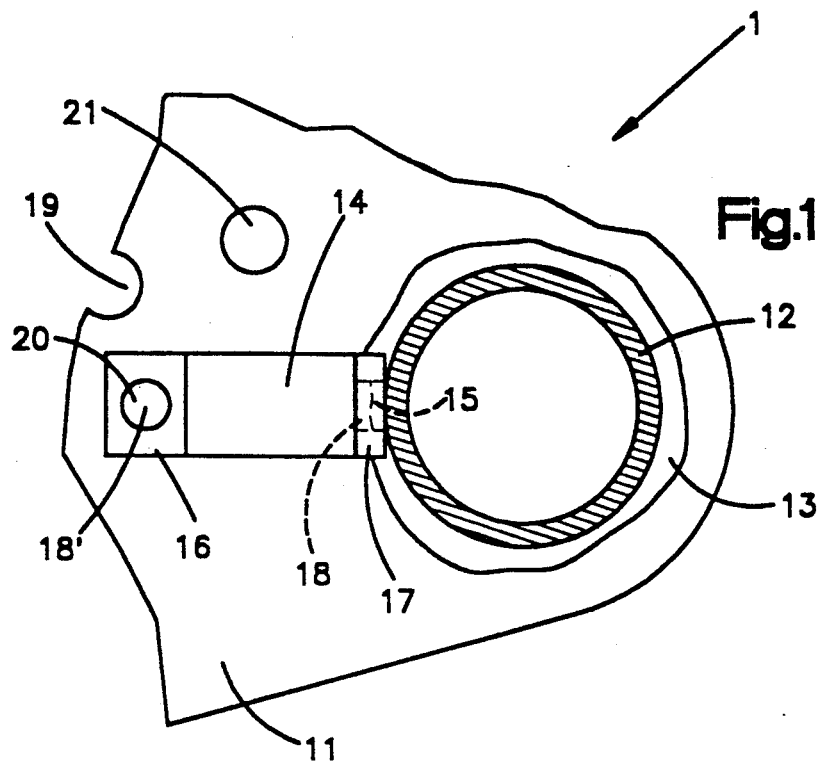
FIG. 1 is a fragmentary plan view of an air chamber bracket intended for a heavy-duty truck brake application.
Figure 2:
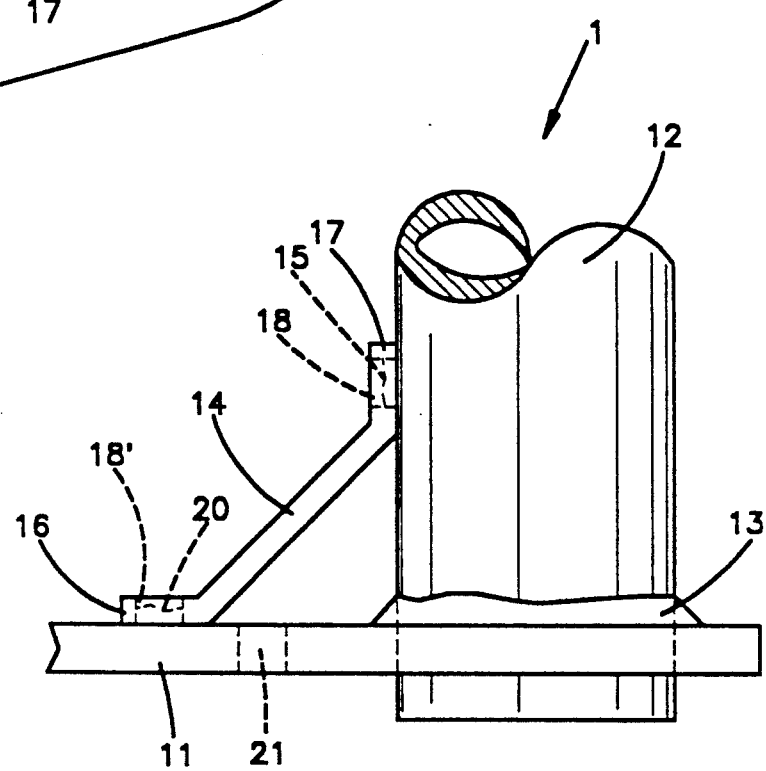
FIG. 2 is a fragmentary side elevation of the bracket of FIG. 1.

Referring to FIGS. 1 and 2, the air chamber bracket is designated generally at 1. A steel arm 11 (grade SAE 1018) is fillet-welded by bead 13 to a mild steel barrel 12 (same grade of steel) to form a right angle joint between the arm and the barrel. The arm 11 is 7/16 inch in thickness; the barrel 12 is ¼ inch in thickness. Bracing and stiffening the joint is a low carbon steel stamping, namely, strap 14, 1 inch wide, about 3 inches long overall, and 5/16 inch thick. It is formed with its feet 16 and 17 having their essentially flat contact surfaces bearing on arm 11 and barrel 12, respectively, at the bottoms of the weld holes 18 and 18', respectively, in the strap.

This type of gusset can be thought of as a "strap gusset." It preferably will be not substantially less than about 0.1" thick for imparting stiffness to a resulting structure. While it can be thicker, about ½-inch is a generally preferred maximum thickness for a gusset of this type.

In each foot of the strap 14 is a ½ inch diameter hole, specifically hole 18 and hole 18'. Plug weld 15 in hole 18 and plug weld 20 in hole 18' may be made by gas metal arc welding a 0.045 inch diameter low carbon steel wire (specification AWS A5.18-79, E70S-6) in, and practically filling the holes 18 and 18'. The plug welds affix the strap 14 to the barrel 12 and arm 11. This welding can be completed manually in 25 seconds or less. The main contact surfaces between feet 16 and 17 of strap gusset 14 and the diverging steel arm 11 and barrel 12 are the interfacial contact zones right around the bottoms of the holes 18 and 18'. By way of contrast, a conventional ¼-inch thick trapezoid-on-edge ("erect") gusset for the same service, one fitting erectly between arm 11 and barrel 12 and standing normal to both those elements, the trapezoid having about 3-inch long base, a 1-inch long opposite parallel side, and fillet welds running around its side and far end edges where it contacts the arm 11 and the barrel 12, takes about three minutes to weld manually using skillful GMAW practice.

An air chamber (not shown) which the bracket 1 is designed to carry may be bolted to the arm 11 to provide an actual cantilevered loading on the fillet-welded joint made with bead 13. The bracket 1 then may be subjected to an accelerated fatigue test at its resonant vibrational frequency. The weld 13 is deemed to have failed when a 1-inch long crack in the weld or along the weld toe can be seen to open and close (a "breathing crack"), as viewed with the naked eye under stroboscopic illumination. Such failure by fatigue cracking of the weld may occur at about 50,000 cycles or higher. This is considered to be satisfactory for the particular truck part; such performance is about the same as when the conventional erect gusset described above is used. Without a gusset, the fatigue life of such bracket (until the above-described failure) may be as low as 3,000–20,000 cycles of vibration.

Figure 3:
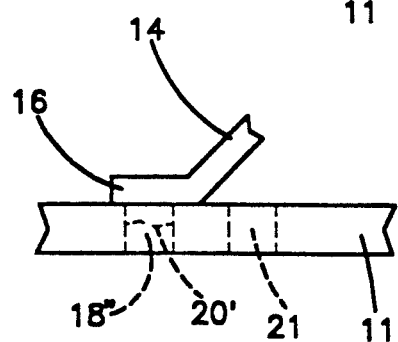
FIG. 3 is a portion of FIG. 2 that shows a suitable plug welding arrangement which is an alternative to that shown in FIG. 2.

Referring to FIG. 3, a plug weld 20' substantially fills weld hole 18" in arm 11 and attaches the imperforate foot 16 of the strap gusset 14 to the arm 11.

Where an interface between a strap gusset foot and a structural portion to which it is to be plug-welded is accessible for welding from each side, the weld hole (or a plurality of weld holes) for the attachment of the foot to said structural portion can be made in either said member or in such foot. If more than one plug weld is made in a particular foot, all the plug welds for that foot may be in weld holes in that foot, or all in weld holes in the structural portion contacting that foot, or part of number in one such place and the rest in the other. Having all the weld holes with all the plug welds in each foot of such footed gusset is normally preferred for convenience of access.

The steel strap gusset of FIGS. 4 and 5 is indicated, as at 4. Its bridging portion 26 is intended to span the gap across an orthogonal corner made by a pair of joined flat steel structural portions (not shown) and brace the resulting corner against fatigue failure. The bridging portion 26 rises at a 45° angle from the horizontal plane, and it faces the viewer of FIG. 4 obliquely.

The gusset 4 has a base foot 28 and an upper foot 27. Foot 28 is the strap end bent to the left to lie flat on one of said flat structural portions. Foot 27 is the strap end bent to the right and upward to lie flat on the other structural portion. Foot 28 has weld hole 31 through it for a plug weld (not shown) to attach the foot 28 to one of the structural portions; foot 27 has weld hole 29 through it for a plug weld (not shown) to attach the foot 27 to the other of the structural portions. Either or both of the feet may be bent to conform to other than flat structural surfaces if necessary or desirable.

The steel strap gusset of FIGS. 6 and 7 is indicated generally by arrow 6. It is intended for the same sort of use as is the gusset 4 of FIGS. 4 and 5, described above. The feet 37 and 38 of gusset 6 at the ends of bridging portion 36 of gusset 6 both are bent strap ends pointing directly to the left. Weld holes 39 and 41 are for the plug welds not shown.

Referring now to FIGS. 8-13, the footed gusset indicated generally by arrow 8 in FIGS. 8 and 9 and the footed gusset indicated generally by arrow 12 in FIGS. 11 and 12 are for service like that of the strap gussets 4 and 6 of FIGS. 4 and 5, respectively. However, the bridging portion 51 of gusset 8 of FIGS. 8 and 9 has a substantially square cross-section. Holes 53 and 56 for plug welds (not shown) are in its integral splayed-out ends 52 and 54, respectively. The bridging portion 61 of gusset 12 of FIGS. 11 and 12 has a substantially circular cross-section. Holes 63 and 66 for plug welds (not shown) are in its integral splayed-out ends 62 and 64, respectively. The feet of these gussets 8 and 12 may be welded onto or pressed out from the metal stock of their respective bridging portions 51 and 61, if desired.

Also, if desired, the strap gusset can be solid or perforate, flat, corrugated, ridged or ribbed. There can be, if desired, more than one weld hole and plug weld therethrough at each interface between the strap and an abutting member to be braced. Normally, one plug weld is adequate when the periphery of the weld hole is ample for a strong weld. If desired, the extreme ends of the feet 16 and 17 of FIG. 1, for example, also can be fillet-welded to the abutting metal structural members, but this usually is not needed to make a serviceable connection, e.g., for an air chamber bracket for an automotive truck. Melting weld holes through the gusset feet and/or the structural members being braced is not as effective as is boring, cutting or punching out the weld holes.

While the preferred weld hole for the plug weld is at least about ¼ inch in diameter for efficiency and economy, such weld hole can have other configurations, if desired. Thus, the plan view of the hole can be, for example, oval, square, or triangular.

The various useful welding processes for the plug welds are fusion welding processes, and they include: gas metal arc welding (GMAW, the first choice); gas tungsten arc welding (GTAW, the second choice); plasma arc welding (PAW); shielded metal arc welding (SMAW); plasma transferred arc welding; and submerged arc welding. Other suitable welding processes include laser beam welding and electron beam welding. The preferred ones lend themselves to especially good control of the energy input to and the weld size of the plug weld. Oxyfuel welds could be used, but generally are thought too slow to be truly practical.

Unless expressly stated otherwise herein, the welding terms used herein are those defined by the American Welding Society in its 1985 publication ANSI/AWS-A 3.0-85 entitled "Standard Welding Terms and Definitions." The principal and preferred metals here are ferrous, e.g., mild steel and stainless steels. Other weldable metals include nickel, cobalt, aluminum, titanium, magnesium, copper and some bronzes.

Many other modifications and variations of the invention will be apparent to those skilled in the art in the light of the foregoing disclosure and drawings. Therefore, it is to be understood that, within the scope of the appended claims, the invention can be practiced otherwise than has been specifically shown and described.

What is claimed is:

1. A fatigue resistant automotive air chamber bracket comprising a pair of joined weldable automotive structural portions subject to dynamic fatigue loading, said structural portions having adjoining surfaces which meet at a junction and diverge therefrom to form a gap therebetween, a brace having a bridging portion with two ends and a weldable foot portion at each end thereof, said brace spanning the gap with one of its foot portions having a contact surface in contact with a contact surface of one of said structural portions to form a first interface, and another of its foot portions having a contact surface in contact with a contact surface of the other of said structural portions to form a second interface, at least one of the contact surfaces having a hole extending therethrough and a plug weld disposed in the hole, and said plug weld attaching one of said foot portions to an associated structural portion at the interface therebetween.

2. The bracket of claim 1 wherein said plug weld is disposed in a weld hole in a foot portion of the brace, and the structural portions and the brace comprise ferrous metal.

3. The bracket of claim 1 wherein one of said contact surfaces is attached to one of said foot portions by a plug weld disposed in a weld hole in one of said structural portions, and the structural portions and the brace comprise ferrous metal.

4. The bracket of claim 1 wherein said structural portions are steel and joined by a fillet weld, the brace comprises a steel strap that is at least about ¼ inch wide and at least about 0.1 inch thick, said brace having bent ends which include said foot portions, the holes for the welds are in said foot portions and are essentially cylindrical, and the plug welds in said holes are gas metal arc welds.

5. A fatigue resistant automotive air chamber bracket comprising:
a pair of steel automotive structural portions subject to dynamic fatigue loading joined by a fillet weld, thereby having their adjoining surfaces diverging to form a gap between them;
a steel strap spanning said gap and bracing said structural portions, the strap being a stamping having a pair of foot portions, the foot portions being bent ends of the strap,
one of said foot portions bearing on one of said adjoining surfaces to form a first interface,
the other of said foot portions bearing on the other of said adjoining surfaces to form a second interface,
each foot portion having at least one weld hole extending therethrough at an interface, and
each of said foot portions having a plug weld disposed in said hole, said plug weld attaching each respective foot portion to the structural portion on which it bears.

6. The bracket of claim 5 wherein the weld holes are substantially round and are at least about ¼ inch in diameter, said structural portions are a barrel and an arm of said air chamber bracket, and the strap is a metal stamping that is at least about ¼ inch wide and at least about 0.1 inch thick.

7. In a process for bracing an automotive air chamber with a gusset to form an air chamber bracket subject to dynamic fatigue loading, the bracket comprising two weldable automotive structural portions, said structural portions having adjoining surfaces which meet at a junction and diverge therefrom to form a gap between each other, the improvement which comprises:
disposing a gusset across the gap, the gusset having a bridging portion with two ends and a weldable foot portion at each end,
one of the foot portions having a contact surface in contact with a contact surface of one of said structural portions to form a first interface, and the other of said foot portions having a contact surface in contact with a contact surface of the other of said structural portions to form a second interface,
at least one of the contacting portions having a hole there through and
welding a plug weld in said hole,
said plug weld affixing a foot portion to one of said structural portions.

8. The process of claim 7 wherein said plug weld is disposed in a hole in a foot portion of the gusset, and the gusset and the structural portions comprise ferrous metal.

9. The process of claim 7 wherein at least one of said contact surfaces is affixed to a foot portion by welding a plug weld in a hole in one of said structural portions, and the gusset and the structural portions comprise ferrous metal.

10. The process of claim 7 wherein said structural portions are steel and are joined by a fillet weld, the brace comprises a steel strap that is at least about ½ inch wide and at least about 0.1 inch thick, the strape having bent ends which include said foot portions, the holes for plug welds are in said foot portions and are essentially cylindrical, and wherein the welding step is performed by gas metal arc welding.

11. The process of claim 7 wherein one of said structural portions is an automotive air chamber and the other of said structural portions is an arm.

* * * * *